US006799222B1

United States Patent
Endo

(10) Patent No.: US 6,799,222 B1
(45) Date of Patent: Sep. 28, 2004

(54) METHOD FOR SYNCHRONIZING PROGRAM APPLIED TO DISTRIBUTED COMPUTER SYSTEM

(75) Inventor: Kotaro Endo, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 664 days.

(21) Appl. No.: 09/632,628

(22) Filed: Aug. 4, 2000

(30) Foreign Application Priority Data

Aug. 13, 1999 (JP) .......................................... 11-229355

(51) Int. Cl.[7] .............................................. G06F 15/16
(52) U.S. Cl. ...................................... 709/248; 709/205
(58) Field of Search ................................ 709/248, 225, 709/226, 205

(56) References Cited

U.S. PATENT DOCUMENTS

| | | | | |
|---|---|---|---|---|
| 5,313,647 A | * | 5/1994 | Kaufman et al. | 709/102 |
| 5,418,937 A | * | 5/1995 | Inoue | 714/47 |
| 5,621,885 A | * | 4/1997 | Del Vigna, Jr. | 714/13 |
| 5,745,888 A | * | 4/1998 | Bauer et al. | 707/1 |
| 5,802,307 A | * | 9/1998 | Melo | 709/232 |
| 5,887,143 A | * | 3/1999 | Saito et al. | 709/248 |
| 6,092,220 A | * | 7/2000 | Palmer et al. | 714/43 |
| 6,108,687 A | * | 8/2000 | Craig | 709/203 |
| 6,178,441 B1 | * | 1/2001 | Elnozahy | 709/203 |
| 6,185,702 B1 | * | 2/2001 | Shirakihara et al. | 714/38 |
| 6,308,223 B1 | * | 10/2001 | Opgenoorth | 709/248 |
| 6,421,701 B1 | * | 7/2002 | Elnozahy | 709/100 |

FOREIGN PATENT DOCUMENTS

| | | | | |
|---|---|---|---|---|
| EP | | 449660 A2 | * 10/1991 | G06F/11/14 |
| JP | 10-111859 | | 4/1998 | |

OTHER PUBLICATIONS

Rajagoplan et al., A Token–Based Protocol for Reliable, Order Multicast Communication, IEEE, pp. 84–93, Aug. 1989.*
L. Rodrigueset et al, "Totally ordered multicast in large–scale systems", In Proc. of the 16th Int. Conf. on Distributed Computer Systems. IEEE, 1996.*
J. Lin and S. Paul, "RMTP: A Reliable Multicast Transport Protocol," in Proceedings of the IEEE Infocom'96, San Francisco, USA, Mar. 1996, pp. 1414–1424.*
B. Whetten et al, "A High Performance Totally Ordered Multicast Protocol," Proceedings of INFOCOM'95, 1995.*

* cited by examiner

Primary Examiner—David Wiley
Assistant Examiner—Yemane M. Gerezgiher
(74) Attorney, Agent, or Firm—Finnegan, Henderson, Farabow, Garrett & Dunner, L.L.P.

(57) ABSTRACT

A method for synchronizing a program that is executed on one of a plurality of computers in a distributed computer system by using a reliable ordered multicast, comprising the steps of generating a new process comprising a program and the status in execution on a computer, and transferring the new process through the reliable ordered multicast to the computers, respectively.

13 Claims, 8 Drawing Sheets

METHOD FOR SYNCHRONIZING PROGRAM APPLIED TO DISTRIBUTED COMPUTER SYSTEM

CROSS-REFERENCE TO RELATED APPLICATIONS

This application is based upon and claims the benefit of priority from the prior Japanese Patent Application No. 11-229355, filed Aug. 13, 1999, the entire contents of which are incorporated herein by reference.

BACKGROUND OF THE INVENTION

The present invention relates to a method for synchronizing program such as a deterministic program by using a reliable ordered multicast in a distributed computer system having a plurality of computers connected by a network, and also concerns such a distributed computer system and a computer as well as a storage medium.

First, an explanation will be given of a deterministic program, a reliable ordered multicast and a synchronizing process that are used in the present specification.

The deterministic program is explained as follows: As illustrated in FIG. 1, a deterministic program 12 is designed in such a manner that upon application of an input to a computer 10, the output and the next status are determined depending on the status 11 of the computer 10 at that time. In other words, in the deterministic program 12, once the output is determined, the next status 12 and the output are uniquely determined. More specifically, it refers to a program in which no reference is made to undefined values and random numbers. The concept of such a deterministic property has been widely used in the field of automaton.

As illustrated in FIG. 2, the characteristic of the deterministic program is that once the initial status and an input string have been determined, the operation is uniquely determined. Hereinafter, the deterministic program is referred to simply as the program.

Moreover, the reliable ordered multicast is explained as follows: In an environment such as a distributed computer system in which a plurality of computers are connected through a network, the respective computers are allowed to operate independently. Therefore, a special scheme is required so as to operate these computers in a synchronized manner. The reliable ordered multicast, which is one of such schemes, is a protocol which distributes data from each computer to all the computers, and which ensures that the order of arrivals of pieces of data is the same in all the computers.

Referring to FIG. 3, a specific example is given of the reliable ordered multicast. Data A, which was transmitted from a computer 10-2 at time t20, is received by all the computers 10-1, 10-2 and 10-3 at times t11, t21 and t31 through an reliable ordered multicast, not shown. Data B, transmitted from a computer 10-3 at t30, is received by all the computers 10-1, 10-2 and 10-3 at times t12, t22 and t32. In this case, data A and data B are received by the respective computers 10-1, 10-2 and 10-3, and the reliable ordered multicast controls the system so that the order of receipts of these two data is the same in all the computers 10-1, 10-2 and 10-3.

Moreover, the synchronizing process is explained as follows: In the distributed computer system, there is a possibility that any of the computers might become out of order independently. Supposing that one disordered computer causes a malfunction in the entire system, the operating ratio of the distributed computer system becomes lower than the operating ratio of any one of the computers.

In order to prevent such a problem, it is necessary to multiplex processes that relate to the entire system. In contrast, the synchronizing process makes it possible to set the operating ratio of the distributed computer system higher than the operating ratio of any one of the computers. For example, in the case when a distributed computer system, constituted by 10 computers each having an operating ratio of 99%, is not multiplexed at all, the operation ratio of the distributed computer system is approximately 90%. Here, when multiplexed by two computers each having an operating ratio of 99%, the process has an operating ratio of approximately 99.99%.

Next, referring to FIG. 4, an explanation will be given of a synchronizing method by using the reliable ordered multicast. In this example, in a distributed computer system having computers 10-1, 10-2 and 10-3, a program execution is multiplexed by using the reliable ordered multicast.

As illustrated in FIG. 4, first, all the computers 10-1, 10-2 and 10-3 are started with a predetermined initial status 11 in which, for example, all variables are set to zero. Data to be input is distributed to all the computers 10-1, 10-2 and 10-3 always through a reliable ordered multicast 13, and inputted to respective programs 12. Here, one output from any one of the computers is taken as an output (in FIG. 4, computer 10-1). The input string of each program is allowed to have the same order by the reliable ordered multicast 13 so that all the computers 10-1, 10-2 and 10-3 are maintained in the same status 11 with their output strings being also the same because of the feature of the program. In other words, the execution of the program is multiplexed.

Next, an explanation will be given of the difference between a system in which synchronizing is made by the reliable ordered multicast and a system in which synchronizing is made by using a master/slave method. In other words, in the master/slave method, while a program is being executed on a master computer, each status is transferred to a slave computer periodically, and in the event of any fault of the master, switching is made to the execution of the program on the slave side; thus, a synchronizing process is achieved.

However, in the case of the master/slave method, back tracking occurs at the time of each taking over, with the result that the switching process at the time of any fault of the computer becomes complex, causing time-consuming tasks.

In contrast, in the case of the application of the reliable ordered multicast, no back tracking occurs at the time of any fault of the computer so that the switching process is simple and no time-consuming task is required.

Moreover, in the master/slave system, overhead is required for copying each status regularly; however, in the application of the reliable ordered multicast, no overhead is required.

In this manner, with respect to processes relating to reliability and performances of the entire system, it is preferable to use the reliable ordered multicast so as to carry out synchronizing.

The master/slave method, on the other hand, is suitable for cases in which a deterministic program is executed or in which executing a program on the slave side is not preferable.

The synchronizing method by the use of the reliable ordered multicast is based upon the premise that all the computers are operated from beginning. However, in an actual operation, there are cases in which a synchronizing process has to be started in the middle of the operation. For example, such cases include cases in which a computer which has been fault is recovered and in which a computer is newly added. In these cases, it is necessary to expanding the synchronizing process.

Referring to FIG. 5, an explanation will be given of a conventional method for expanding the synchronizing process by the use of the reliable ordered multicast. In FIG. 5, at Step 1, the reliable ordered multicast 13 is temporarily stopped. Next, at Step 2, the status 11 is copied on the computer 10-3 to be included. Next, at Step 3, the group of the reliable ordered multicast 13 is expanded and resumed.

In this method, supposing that a copy of any status is not appropriately carried out, the operation of the computer that has been included becomes different from the other computers. Of course, since the copy is made after the reliable ordered multicast has been temporarily stopped to maintain an invariable status, such an event will never occur in principle, and all the computers are allowed to start with the same operation when the reliable ordered multicast is resumed.

However, in the case when the status of computer is complex, it is not easy to acquire the status accurately, and a bug might be contained in some cases. In such a case, in the conventional system, only the computer that has been included malfunctions, and the other computers are operated normally, resulting in a problem in which it becomes all the more difficult to discover any defect.

BRIEF SUMMARY OF THE INVENTION

The object of the present invention is to provide a program synchronizing method capable of synchronizing a deterministic program by using a reliable ordered multicast independent of the status of computer, a distributed computer system, a computer and a storage medium.

In order to solve the above-mentioned problem, the method for synchronizing a program that is executed on one of a plurality of computers in a distributed computer system by using a reliable ordered multicast, comprising the steps of: generating a new process comprising a program and the status in execution on a computer; and transferring the new process through the reliable ordered multicast to the computers, respectively.

Moreover, a system for synchronizing a program in accordance with the present invention, which is applied to a distributed computer system having a reliable ordered multicast, comprising: means for generating a new process comprising a program and the status in execution on one of the computers; and means for transferring the new process through the reliable ordered multicast to the computers, respectively.

Furthermore, a computer in accordance with the present invention, to be adapted a distributed computer system by using a reliable ordered multicast, comprising: generation means for generating a new process comprising a program and the status in execution on the computer; and transferring means for transferring new process through the reliable ordered multicast to the other computers of the distributed computer system.

A computer readable storage medium in accordance with the present invention, which is readable by a computer, and applied one of a plurality computers in a distributed computer system having a reliable ordered multicast, and synchronizing method including the steps of: generating a new process comprising a program and the status in execution on a computer; and transferring new process through the reliable ordered multicast to the computers, respectively.

In accordance with the present invention, the process in execution need not be expanded, and a new process is generated in a separated manner so that the status is transferred or copied from the process in execution to the new process; therefore, any possible error, etc. at the time of acquiring the status does not give adverse effects on the synchronizing process. Moreover, different from the conventional system, since it is not necessary to expand the reliable ordered multicast itself, it is possible to simplify the reliable ordered multicast protocol as compared with the conventional system, and consequently to improve the performances and reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to Figures, the following description will discuss one embodiment of a program synchronizing method in accordance with the present invention in detail.

First, prior to the explanation of the present embodiment, an explanation will be given of the concept of a process used in the present invention.

This process is constituted by a reliable ordered multicast, a program transferred by respective computers and the status, which forms an execution unit having a high operating ratio.

Under the concept of the above-mentioned process, the synchronizing method of the present invention, which is different from the conventional method in that it need not expand the process in execution, generates a new process and copies or transfers the status of the process in execution on the new process.

Figure 6:
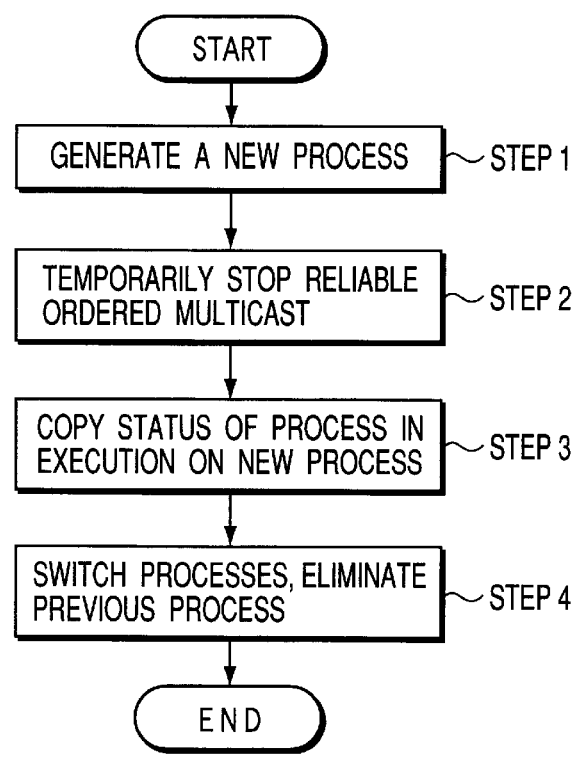
FIG. 6 is a flowchart that shows one embodiment of a program synchronizing method in accordance with the present invention.
Figure 7:
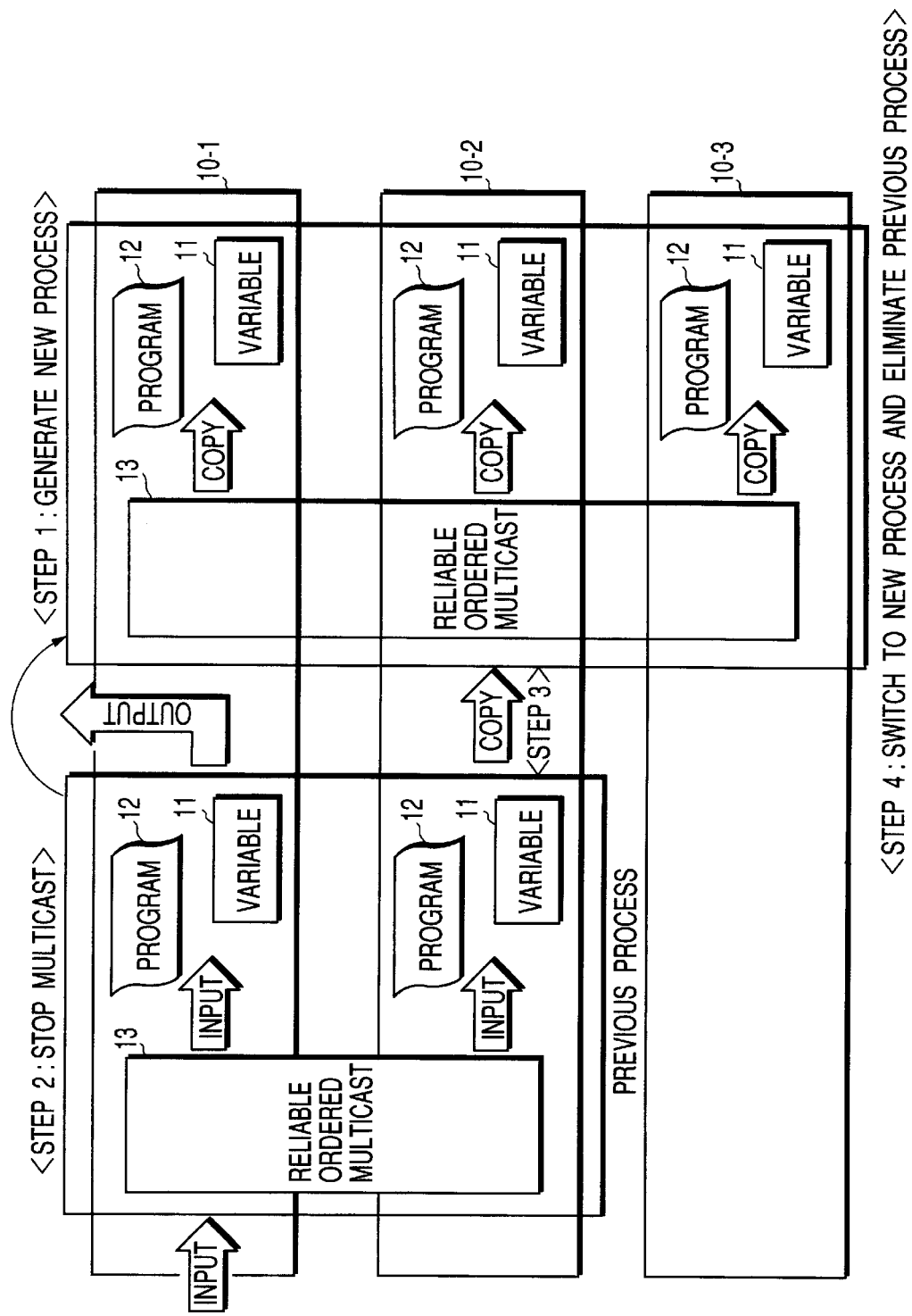
FIG. 7 is a drawing that shows one embodiment of a program synchronizing method in accordance with the present invention.

Therefore, as illustrated in FIGS. 6 and 7, the new process is generated in a separated manner at Step 1. At Step 2, the reliable ordered multicast of the process in execution is temporarily stopped. At Step 3, the status of the process in execution is transferred or copied on the new process. At Step 4, switching is made so as to allow the new process to carry out input and output operations, and the previous process is eliminated.

In this case, the copying of the status onto the new process is carried out through the reliable ordered multicast so that it is ensured that all the computers are in the same status. Moreover, even if the status is not acquired correctly, the statuses of all the computers are the same. In other words, even in such a case, after the resumption, all the computers start carrying out the same operation.

Figure 8:
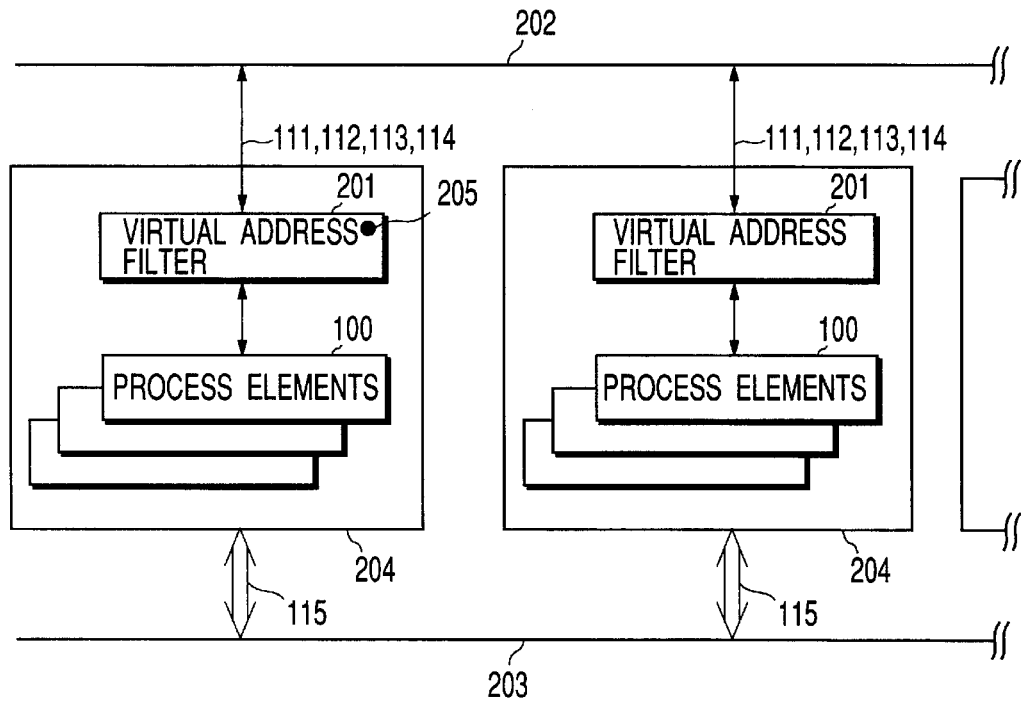
FIG. 8 is a block diagram that shows one example of a distributed computer system to which the method of the embodiment is applied.
Figure 9:
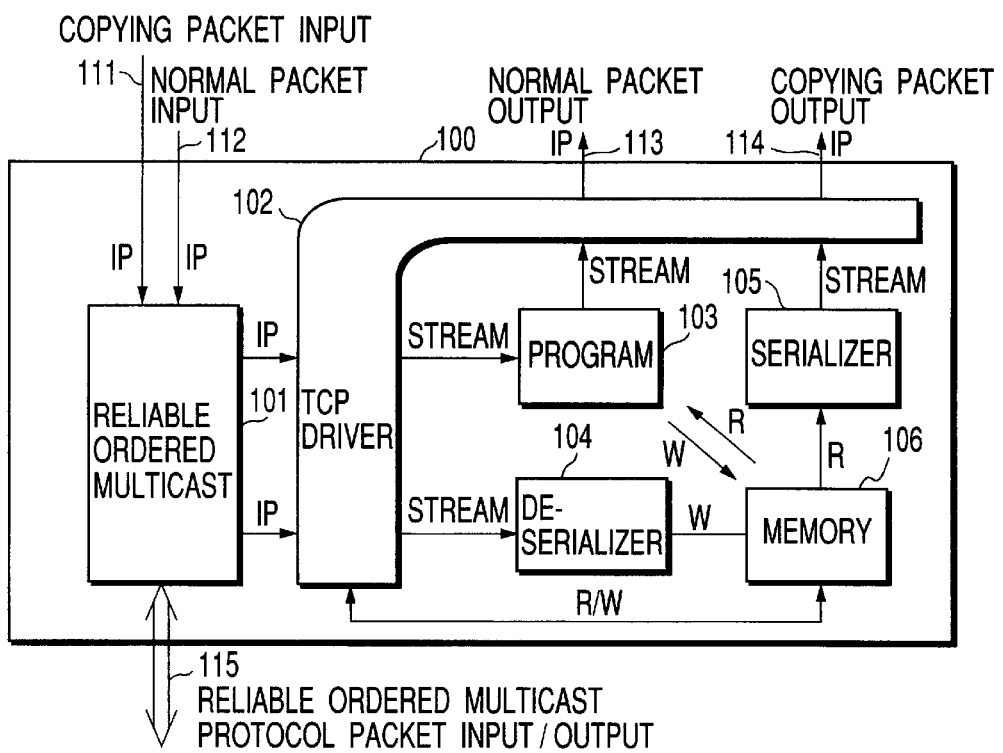
FIG. 9 is a detailed block diagram that shows an example of process elements of the computer in FIG. 8.

Next, referring to FIGS. 8 and 9, the following description will discuss the program synchronizing method of the present embodiment in association with a distributed computer system to which the present method is applied. FIGS. 8 and 9 show the distributed computer system to which the program synchronizing method of the present embodiment is applied, and a plurality of computers 204 are connected to a network 202. Each computer 204 has a plurality of process elements 100 and a virtual address filter 201.

On one or a plurality of the process elements 100 constituting each computer 204, hardware is operated so that the built-in program is executed; thus, a program applied from an external storage medium is executed or a program applied through the network is executed so that the program synchronizing method is carried out.

Here, there are a plurality of process elements 100 on each computer 204, and an aggregate of these constitutes a process. As illustrated in FIG. 9, the process elements 100 include a reliable ordered multicast element 101, a TCP (transmission-control-protocol) driver 102, a program 103, a deserializer 104 and a serializer 105.

In FIG. 9, the reliable ordered multicast elements 101 are placed on each computer 204, and an aggregate of these forms a reliable ordered multicast. Among the reliable ordered multicast elements 101, reliable ordered multicast protocol packet input and output 115 are transmitted and received so that a function as the reliable ordered multicast is realized.

The TCP driver 102 controls the retransmission and rearrangement of the packets, and converts the packet data in a random order into sequential data. The status of the TCP for processing normal packets is stored in a memory 106. The status of the TCP for processing copied packets is not stored in the memory 106.

The program 103, which is an arbitrary program, inputs the sequential data from the TCP driver 102, refers to the memory 106 so as to update it, and outputs the data to the TCP driver 102. The program 103 is the same on all the computers.

The deserializer 104 converts the sequential data inputted from the TCP driver 102 into the status of the memory 106 and writes the resulting data therein.

The serializer 105 converts the status of the memory 106 into the sequential data, and outputs it to the TCP driver 102.

The memory 106 maintains the status.

A copying packet input 111 arranges the copying packet through the reliable ordered multicast element 101, and inputs it to the TCP driver 102.

A normal packet input 112 arranges the normal packet through the reliable ordered multicast element 101, and inputs it to the TCP driver 102.

A copying packet output 113 is derived from the sequential data outputted from the serializer 105 and converted by the TCP driver 102.

A normal packet output 114 is derived from the sequential data outputted from the program 103 and converted by the TCP driver 102.

Reliable ordered multicast protocol packet input-output 115 processes are carried out so that the copying packet input 101 realizes a reliable ordered multicast protocol.

The virtual address filter 201 transmits the copying packet input 111, the normal packet input 112, the copying packet output 113 and the normal packet output 114 only when they have a logical IP address corresponding to a process in question. The logical IP address corresponding to the process exists only on any one of the computers; therefore, among the process elements constituting the process, only one process element is allowed to carry out input-output processes through the network.

The network 202 is a LAN connected to the Internet, through which the copying packet and the normal packet are flowed.

An interconnector 203 is an exclusive high-speed network through which the reliable ordered multicast protocol packet is flowed.

Figure 1:
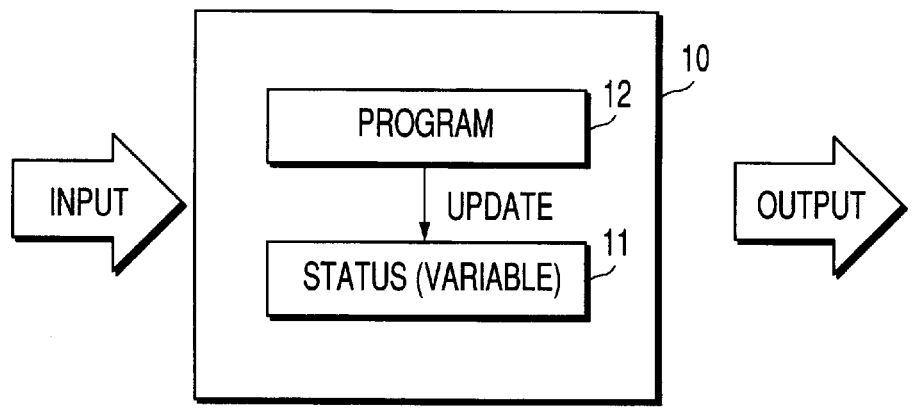
FIG. 1 is a drawing that shows the concept of a deterministic program.
Figure 2:
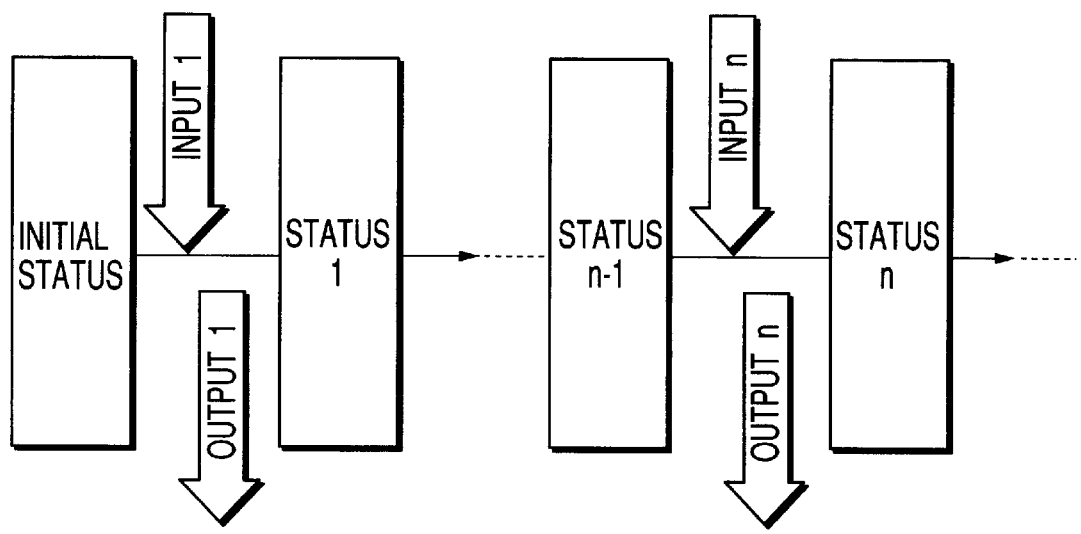
FIG. 2 is a drawing that shows the transition of status in the deterministic program.
Figure 3:
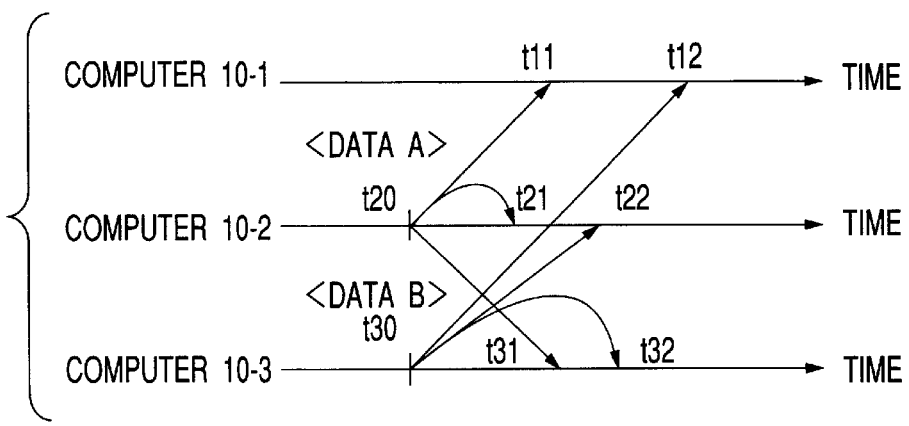
FIG. 3 is a drawing that explains a reliable ordered multicast.
Figure 4:
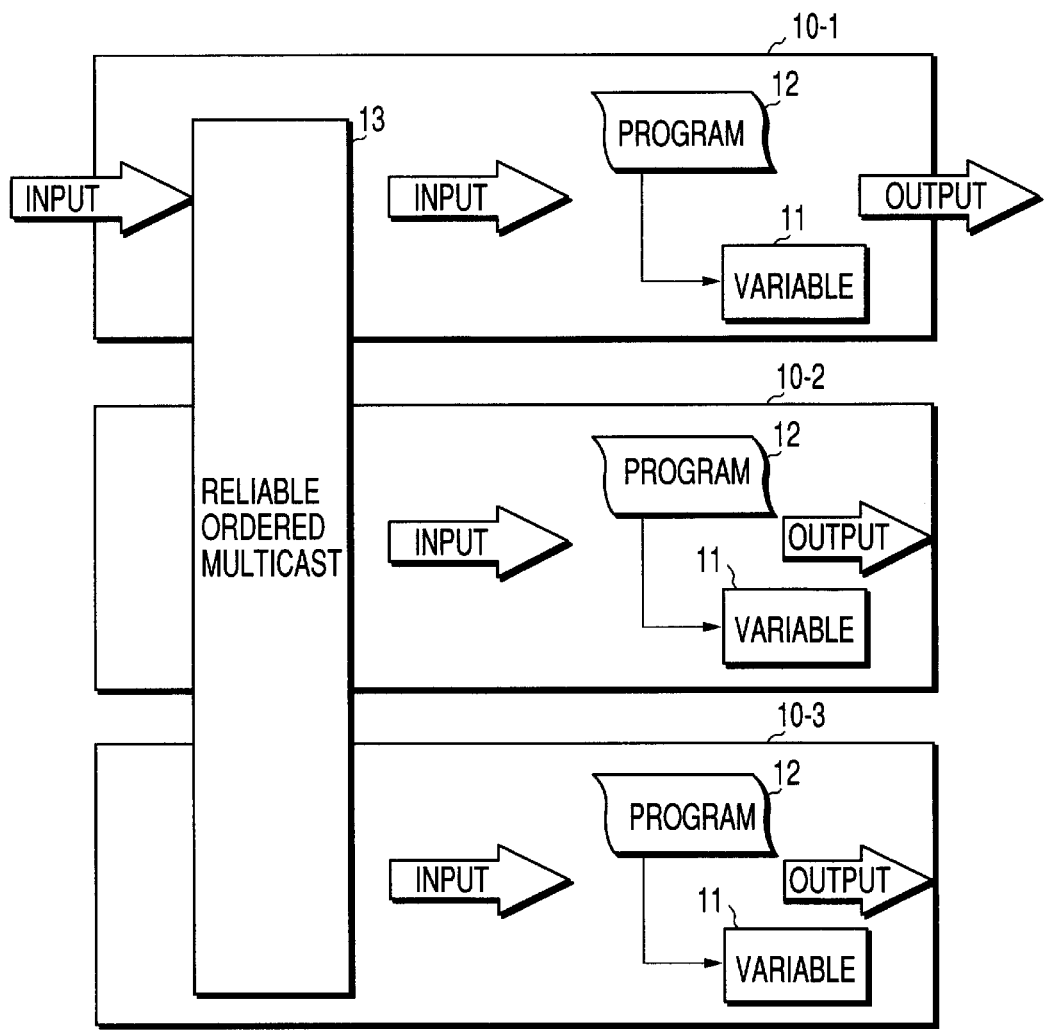
FIG. 4 is a drawing that shows an example of a data distribution by the reliable ordered multicast.
Figure 5:
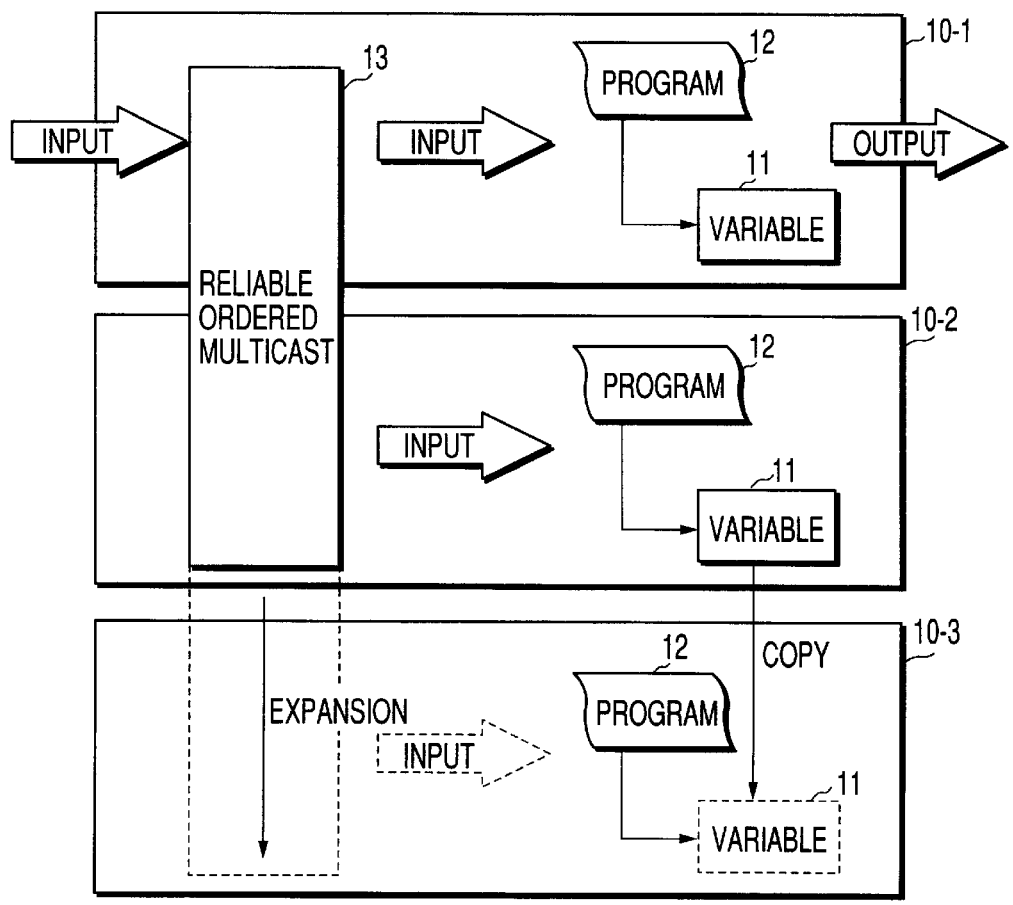
FIG. 5 is a drawing that shows a conventional synchronizing method by the use of the reliable ordered multicast.

The computers 204 constitute a distributed computer system. In FIG. 2, only two are shown, but two or more computers may be used.

The logical IP address 205 corresponds to one process. This includes a normal logical IP address corresponding to the process in execution, and an activating logical IP address that is used only at the time of expansion.

Here, IP (internet protocol) indicates an IP packet, stream represents the sequential data, R indicates reading out from the memory 106, W indicates writing into the memory, and R/W represents reading/writing out/into the memory.

Next, referring to FIGS. 10 and 11, an explanation will be given of an operation for expanding the synchronizing process in the present embodiment. Here, FIG. 10 shows the operation during the expansion, and FIG. 11 shows the operation after the expansion.

Figure 10:
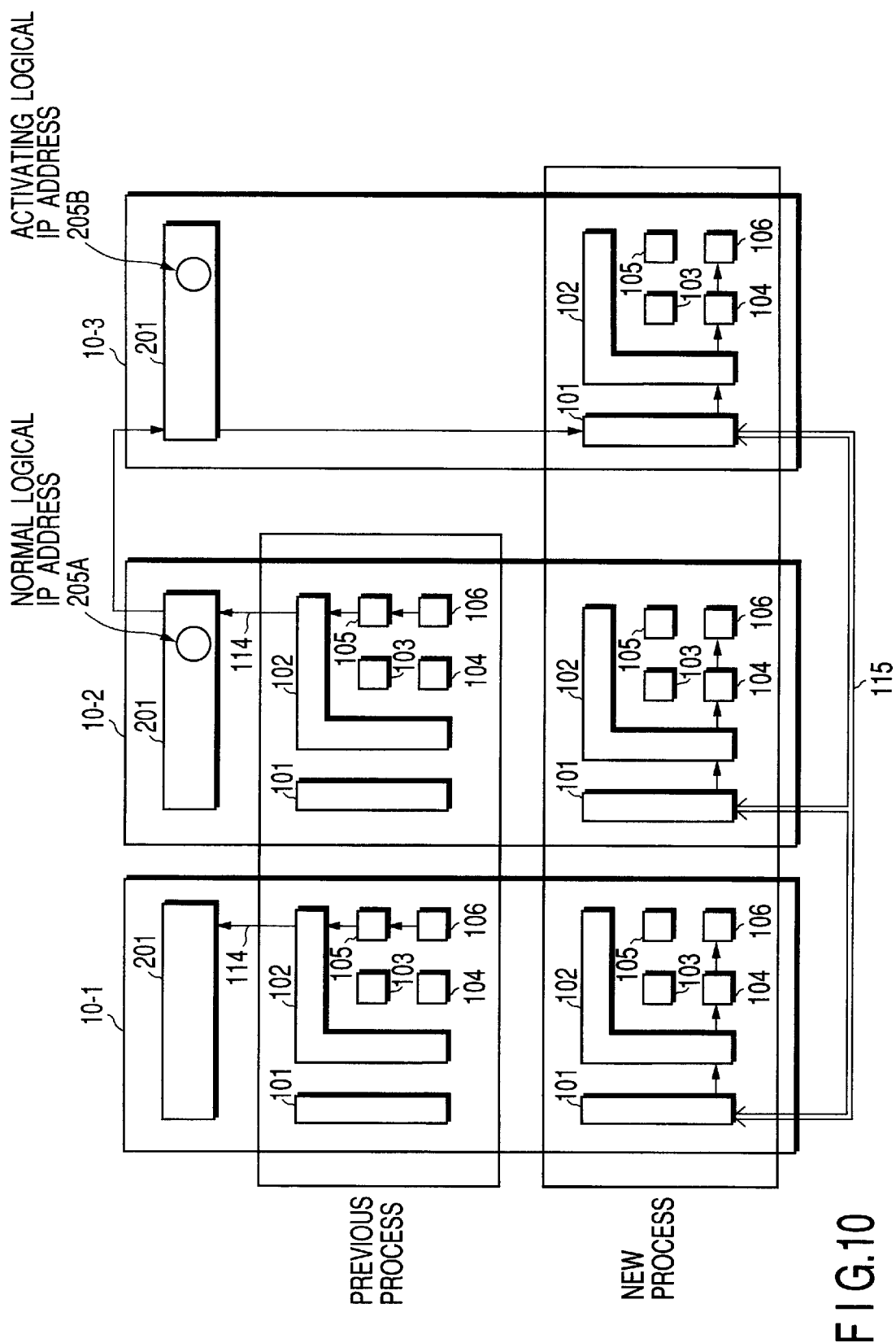
FIG. 10 is a block diagram that explains an operation that is expanding the synchronizing process in the embodiment.

As indicated by arrows in FIG. 10, in the present invention, a new process is generated (Step 1) upon expansion. In this case, the reliable ordered multicast in execution is temporarily stopped (Step 2). An activating logical IP address 205B is assigned to the new process, thereby making it distinct from a normal logical address 205A that has been assigned to the process (previous process) in execution. At Step 3, the copying of the status is carried out through the memory 106, the serializer 105, the virtual address filter 201, the reliable ordered multicast elements 101, the TCP driver 102, the deserializer 104 and the memory 106.

Figure 11:
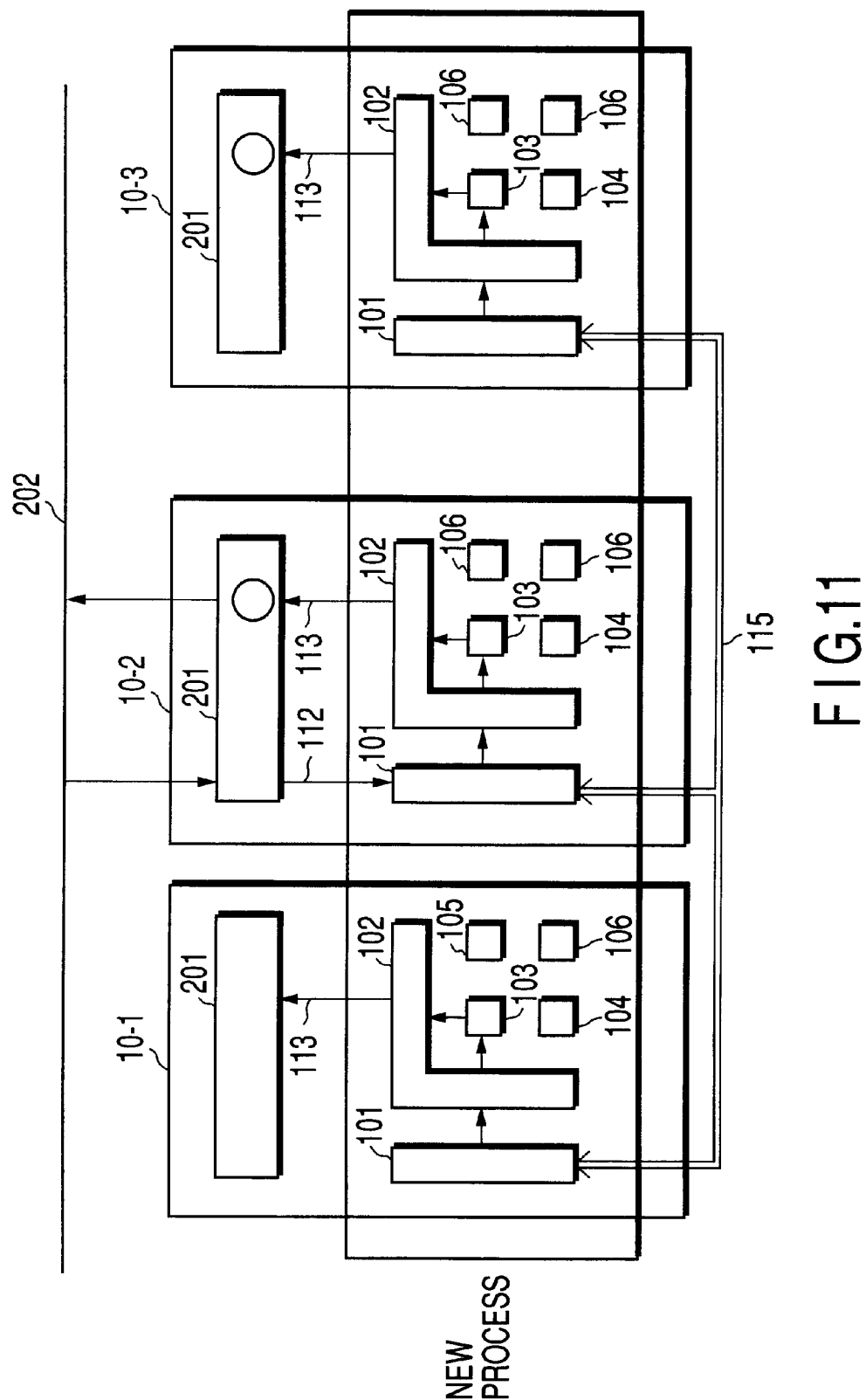
FIG. 11 is a block diagram that explains an operation after the expansion of the synchronizing process in the embodiment.

FIG. 11 shows a state in which copying of the status has been complete, and at Step 4, the previous process is eliminated, with the result that the normal logical address 205A which corresponded to the previous process is switched so as to correspond to the new process. At the same time, the activating logical IP address 205B that corresponded to the new process is eliminated.

As described above, the present embodiment features that the scheme of the synchronizing process itself is less susceptible to damages due to an error, etc., at the time of acquiring the status, and it is not necessary to expand the reliable ordered multicast itself. Therefore, it is possible to simplify the reliable ordered multicast protocol as compared with the conventional system, and consequently to improve the performances and reliability. Moreover, since the scheme of the synchronizing process itself is less susceptible to damages due to an error, etc., at the time of acquiring the status, it is possible to improve the reliability of the system as a whole, and also to shorten the developing period.

The present invention is not intended to be limited by the above-mentioned embodiment. In other words, the program 103 may be a Java (object oriented programming language designed by Sun Microsystems, Inc.) program, and the programs 104 and 105 may be a deserializer and a serializer on the Java respectively.

In this case, since the serializing function is possessed by the Java itself, it is not necessary to newly form the deserializer 104 and the serializer 105 on the Java; therefore, the developing period can be shortened.

Moreover, in the above-mentioned embodiment, the program 103 may be a program for packaging a Lisp interpreter, and the serializer 105 may be a serializer for outputting only a cell that is being used. In this case, instead of the Lisp interpreter, the program 103 may be provided as a Java interpreter.

In the case when, in this manner, the program 103 is provided as the Lisp interpreter or the Java interpreter and when the serializer 105 is allowed to output only a cell that is being used, although the contents of the memory are not accurately the same between the previous process and the new process, the same process as a garbage collection is actually carried out, with the result that the actual operation is maintained normally, and improvements in the performances such as elimination of fragmentation in the memory can be obtained.

This system is allowed to utilize the feature that, even if the status of a computer is not accurately obtained, the statuses of all the computers can be maintained in the same manner.

Moreover, in the above-mentioned embodiment, the new process may be generated on another computer different from one related to the process in execution so that the synchronizing process is not expanded, but may be transferred or reduced. As compared with the conventional method in which the synchronizing process is not easily transferred, this modified example is effective upon replacement of the system or temporary stoppage of the computer for maintenance.

Figure 12:
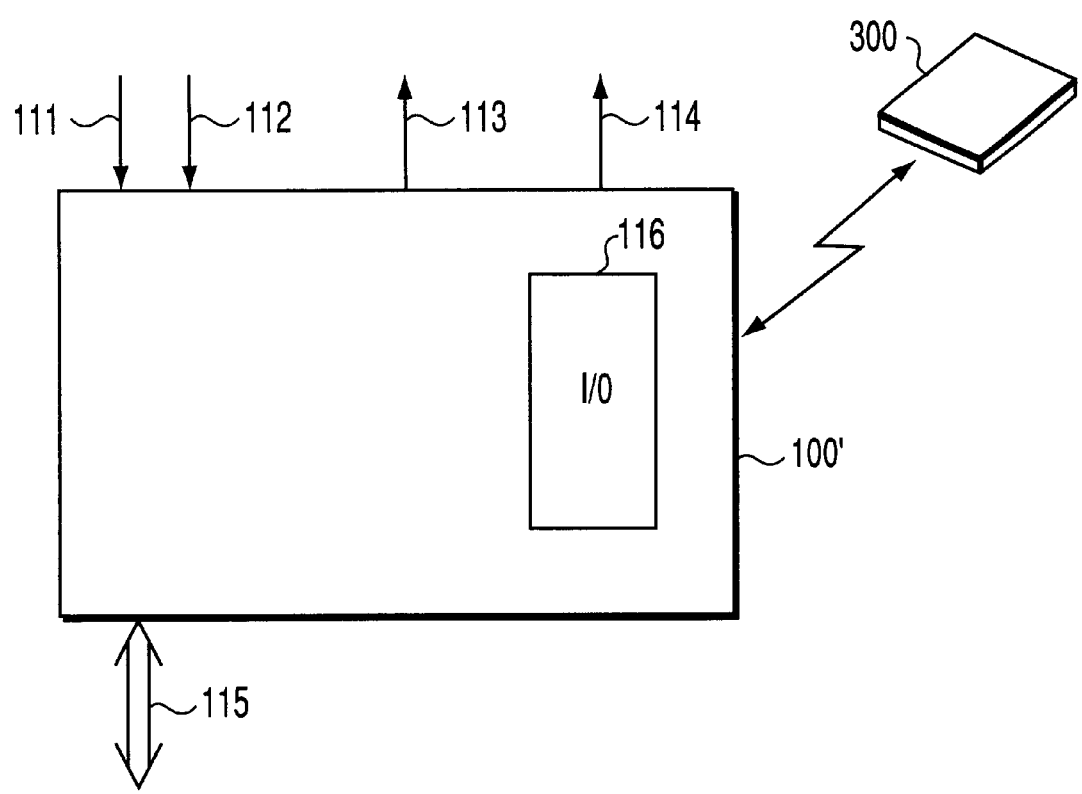
FIG. 12 is a detailed block diagram that shows another example of process elements of the computer in FIG. 8.

Furthermore, in the technique described in the above-referenced embodiment, as illustrated in FIG. 12, a program to be executed by the computers may be stored and distributed in and from the storage medium 300 through an I/O 116. Here, in the above-mentioned recording medium 300, any storage system may be used, as long as the storage medium can store the program therein and the computers can read data therefrom; examples thereof include: a magnetic disk, a floppy disk, a hard disk, an optical disk (CD-ROM, CD-R, DVD, etc.), a magneto-optical disk (MO, etc.) and a semiconductor memory, etc.

Moreover, an OS (operating system) or MW (Middle Ware), such as data-base managing software and network software, which is executed on the computer based upon instructions of a program installed from the storage medium to the computer, may execute one portion of the respective processes for realizing the present embodiment.

Here, not limited to a medium independent from the computers, the storage medium of the present invention may include a recording medium in which a program, transferred from a network such as the LAN or Internet, has been downloaded and stored or temporarily stored.

Moreover, not limited to one medium, the storage medium of the present invention may include a case in which the processes of the present embodiment are executed by a plurality of media; thus, any construction of the storage medium may be used.

Furthermore, the computer in this embodiment, which executes the respective processes of the present embodiment based upon the program stored in the storage medium, may have any construction such as an apparatus constituted by one computer such as a personal computer and a system in which a plurality of apparatuses are connected through a network.

Here, not limited to a personal computer, the computer may be a processor included in an information processing apparatus, a microcomputer, etc., and may generally include any apparatus and device that can achieve the functions of the present invention through the program.

As described above, in accordance with the present invention, in a separated manner from a process in execution, a new process is then generated, and the status of the computer that is executing the process is copied onto the new process from the process in execution through the reliable ordered multicast; thus, since the process in execution is not expanded, and the new process generated in a separated manner is allowed to copy the status from the process in execution, any possible error, etc., at the time of acquiring the status does not give adverse effects on the synchronizing process itself. Moreover, different from the conventional system, it is not necessary to expand the reliable ordered multicast itself, and it is possible to further simplify the reliable ordered multicast protocol as compared with the conventional system, and consequently to improve the performances and reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for synchronizing a program that is executed on one of a plurality of computers in a distributed computer system by using a reliable ordered multicast, comprising the steps of:

generating a new process comprising a program and a status on a first computer of the distributed computer system;

copying a status of a process in execution on a second computer in the distributed computer system through the reliable ordered multicast to the status of the new process on the first computer;

processing data using the reliable ordered multicast so that the order of data arrivals is all the same onto the plurality of computers;

externally supplying packet data to a transmission-control-protocol driver in a random order to convert into sequential data;

after the sequential data have been inputted from the transmission-control-protocol driver to a program, and subjected to a predetermined process, outputting the resulting data from the program to the transmission-control-protocol-driver;

deserializing the sequential data inputted from the transmission-control-protocol driver into a memory for holding the status of each computer;

converting the status in the memory to resulting sequential data;

outputting the resulting sequential data to the transmission-control-protocol driver; and filtering the packet data by a virtual address filter.

2. The method for synchronizing a program according to claim 1, wherein prior to copying the status of the process in execution on the second computer, the status of the first computer is arranged.

3. The method for synchronizing a program according to claim 2, wherein the arrangement of the status of the first computer includes at least one of: elimination of unnecessary information, optimization of memory placement and optimization of inherent objects.

4. A system for synchronizing a program, which is applied to a distributed computer system having a reliable ordered multicast, comprising:

means for generating a new process comprising a program and a status on a first computer of the distributed computer system;

means for copying a status of a process in execution on a second computer in the distributed computer system through the reliable ordered multicast to the status of the new process;

means for processing data using the reliable ordered multicast so that the order of data arrivals is all the same onto the plurality of computers;

means for externally supplying packet data to a transmission-control-protocol driver in a random order to convert into sequential data;

means for outputting the resulting data from the program to the transmission-control-protocol-driver after the sequential data have been inputted from the transmission-control-protocol driver to a program, and subjected to a predetermined process;

means for deserializing the sequential data inputted from the transmission-control-protocol driver into a memory for holding the status of each computer;

means for converting the status in the memory to resulting sequential data;

means for outputting the resulting sequential data to the transmission-control-protocol driver; and means for filtering the packet data by a virtual address filter.

5. The system for synchronizing a program according to claim 4, further comprising means for arranging the status of the first computer prior to copying the status of the second computer.

6. The system for synchronizing a program according to claim 5, wherein the means for arranging the status of the first computer carries out a process including at least one of: elimination of unnecessary information, optimization of memory placement and optimization of inherent objects.

7. A computer, to be adapted to a distributed computer system by using a reliable ordered multicast, comprising:

generation means for generating a new process comprising a program and a status on a computer of the distributed computer system;

copying means for copying a status of a process in execution through the reliable ordered multicast to the new process;

process elements; and a virtual address filter, wherein each process element comprises:

reliable ordered multicast elements which form a protocol for distributing data, and process the data so that the order of data arrivals is all the same onto the other computers;

a transmission-control-protocol-driver for converting packet data externally supplied thereto in a random order into sequential data;

a program which, after the sequential data have been inputted from the transmission-control-protocol-driver, and subjected to a predetermined process, again outputs the resulting data to the transmission-control-protocol-driver;

a deserializer for deserializing the sequential data inputted from the transmission-control-protocol-driver;

a memory for holding the status of each computer; and a serializer for converting the status in the memory to sequential data and for outputting the resulting data to the transmission-control-protocol-driver.

8. The computer according to claim 7, further comprising a means for arranging the status of the computer prior to copying the status of the computer.

9. The computer according to claim 8, wherein the means for arranging the status of the computer carries out a process including at least one of: elimination of unnecessary information, optimization of memory placement and optimization of inherent objects.

10. The computer according to claim 7, further comprising means for generating the new process on a different computer from the computer executing the process.

11. A method for synchronizing processes executing on computers in a distributed computer system, the method comprising the steps of:

facilitating execution of a new process on a first one of the computers in the distributed system;

determining a status of an existing process executing on a second one of the computers in the distributed system;

using a reliable ordered multicast to copy information reflecting the status of the process executing on the second computer; using the copied information to synchronize the execution of the new process with the execution of the existing process;

processing data using the reliable ordered multicast so that the order of data arrivals is all the same on the computers in the distributed system;

externally supplying packet data to a transmission-control-protocol driver in a random order to convert into sequential data;

after the sequential data have been inputted from the transmission-control-protocol driver to a program, and subjected to a predetermined process, outputting the resulting data from the program to the transmission-control-protocol-driver;

deserializing the sequential data inputted from the transmission-control-protocol driver into a memory for holding the status of each computer;

converting the status in the memory to resulting sequential data;

outputting the resulting sequential data to the transmission-control-protocol driver; and filtering the packet data by a virtual address filter.

12. The method of claim 11, wherein the information regarding the status of the process executing on the second computer includes one of: elimination of unnecessary information, optimization of memory placement, and optimization of inherent objects.

13. The method of claim 1, further comprising the step of:

setting a status of the new process to match the status of the existing process.

* * * * *